UNITED STATES PATENT OFFICE.

THEODORE W. CASE, OF SCIPIO, NEW YORK.

NEW COMPOUND SHOWING VARIABLE RESISTANCES UNDER THE INFLUENCE OF LIGHT.

1,316,220.               Specification of Letters Patent.     Patented Sept. 16, 1919.

No Drawing.      Application filed February 19, 1917. Serial No. 149,705.

*To all whom it may concern:*

Be it known that I, THEODORE W. CASE, a citizen of the United States of America, and resident of Scipio, in the county of Cayuga, in the State of New York, have invented new and useful Improvements in New Compounds Showing Variable Resistances Under the Influence of Light, of which the following is a full, clear, and exact description.

This invention relates to certain improvements in new compounds showing a variable resistance, and specifically contemplates a material as an element of an electric curcuit subject to the condition that variations in light produce a corresponding variation in the electrical resistance of the element, thereby effecting a change of current in accordance with variations of light intensity to which the element is exposed.

The object, therefore, of the invention is the production of a material adapted to form a portion of an electric circuit or conductor, the resistance of which diminishes as the intensity of the light to which it is exposed increases.

I have discovered that a material consisting of or containing bismuth and sulfur in varied percentages can be utilized as a portion of an electric circuit, and that when so incorporated, its resistance to the passage of electric current through said circuit varies under the influence of light to effect a change of current in accordance with the intensity of the light rays to which the substance is subjected, and that a bismuth sulfid is peculiarly efficient for this purpose and highly sensitive to variations in light intensity, due to the fact that the percentage change of its resistance to the passage of an electric current under variations of light intensity is great. As illustrative of such a material I find that the combination $Bi_2S_3$ is highly efficient in the practical application of my invention. This is particularly true of certain types of acicular crystals, commonly called bismuthinite which are supposed to be $Bi_2S_3$.

The compound, material or resistance element may be incorporated in an electric circuit in any suitable way, as by laying crystals of the same in contact with each other, the terminal crystals connected in the circuit, and may constitute any portion or part of such circuit and when so embodied the crystals may be supported in any suitable way for contact with each other and exposure to light rays.

The invention is adapted for and may be applied to various uses, as, for instance, in the Bell photophone, and I, therefore, desire to broadly claim the same without restriction as to the method, manner or condition of use and without limitation as to the addition of other elements to the compound or material not destroying its usefulness for this purpose, and for use with both direct and alternating current.

What I claim is:

1. A resistance element formed of a compound of bismuth and sulfur.

2. A resistance element formed of a compound comprising bismuth and sulfur.

3. A resistance element formed of a material comprising a compound of bismuth and sulfur.

4. An electric circuit having a portion supported for exposure to light rays, such portion comprising a compound of bismuth and sulfur.

In witness whereof I have hereunto set my hand this 14th day of February, 1917.

THEODORE W. CASE.

Witnesses:
  E. C. THOMPSON,
  HOWARD P. DENISON.